(12) United States Patent
Biedermann

(10) Patent No.: US 6,400,938 B1
(45) Date of Patent: Jun. 4, 2002

(54) PROCESS FOR CONTROLLING THE INITIATION OF EMERGENCY CALLS IN CORDLESS TELECOMMUNICATION SYSTEMS, IN PARTICULAR DECT/GAP SYSTEMS

(75) Inventor: Rolf Biedermann, Ahaus (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/230,497
(22) PCT Filed: Sep. 5, 1997
(86) PCT No.: PCT/DE97/01976
§ 371 (c)(1), (2), (4) Date: Jan. 28, 1999
(87) PCT Pub. No.: WO98/11741
PCT Pub. Date: Mar. 19, 1998

(30) Foreign Application Priority Data

Sep. 11, 1996 (DE) .......................................... 196 38 173

(51) Int. Cl.[7] .............................................. H04M 11/00
(52) U.S. Cl. ........................................ 455/404; 455/465
(58) Field of Search ................................. 455/404, 410, 455/411, 502, 462, 465

(56) References Cited

U.S. PATENT DOCUMENTS 5,864,755 A * 1/1999 King et al. ................. 455/404

FOREIGN PATENT DOCUMENTS

DE 41 30 647 A1 3/1993
DE 44 13 974 A1 11/1995

(List continued on next page.)

OTHER PUBLICATIONS

Philips Telecommunication Review, R. J. Mulder, "DECT, a universal cordless access system", pp. 68–73.

IEEE Communications Magazine, Jan. 1995, David D. Falconer et al, Time Division Multiple Access Methods for Wireless Personal Communications, pp. 50–57.

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

Telcom Report 16 (1993), No. 1, J. H. Koch: "Digitaler Komfort für schnurlose Telekommunikation—DECT–Standard eröffmet neue Nutzungsgebiete", pp. 26–27.

tec 2/93 —Das technische Magazin von Ascom "Wege zur universellen mobilen Telekommunikation", pp. 35 to 42.

Components 31 (1993), No. 6, S. Althammer, D. Brückmann: Hochoptimierte IC's fü r DECT–Schnurlostelefone, pp. 215–218.

Unterrichtsblätter—Deutsche Telekom Jg. 48, Feb. 1995, Protokolle am Beispiel des OSI–Referenzmodells, pp. 102–111.

ETSI—Publication, Oct. 1992, ETS 300175 1 . . . 9, Part 1: Overview, pp. 1–30; Part 2: Physical layer pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

(List continued on next page.)

Primary Examiner—Nguyen T. Vo
(74) Attorney, Agent, or Firm—Bell, Boyd & Lloyd LLC

(57) ABSTRACT

In order to control the making of emergency calls in cordless telecommunications systems efficiently and reliably, a special procedure allows to contain the system contains mobile parts which do or do not have access authorization to base stations.

11 Claims, 5 Drawing Sheets

FOREIGN PATENT DOCUMENTS

| | | |
|---|---|---|
| EP | 0 490 441 A2 | 6/1992 |
| EP | 0 632 635 A2 | 1/1995 |
| JP | 7-254933 | 10/1995 |
| WO | WO 94/10764 | 5/1994 |
| WO | WO 94/10785 | 11/1994 |
| WO | WO 95/05040 | 2/1995 |
| WO | WO 96/12264 | 4/1996 |

OTHER PUBLICATIONS

ETSI—Publication, Apr. 1995, prETS 300444, Generic Access Profile, pp. 1–129.

Int. Standard Book No. 2–9507190–7, (1992), M. Mouly et al, The GSM System for Mobile Communications, pp. 49, 435, 437 and 532–535.

* cited by examiner

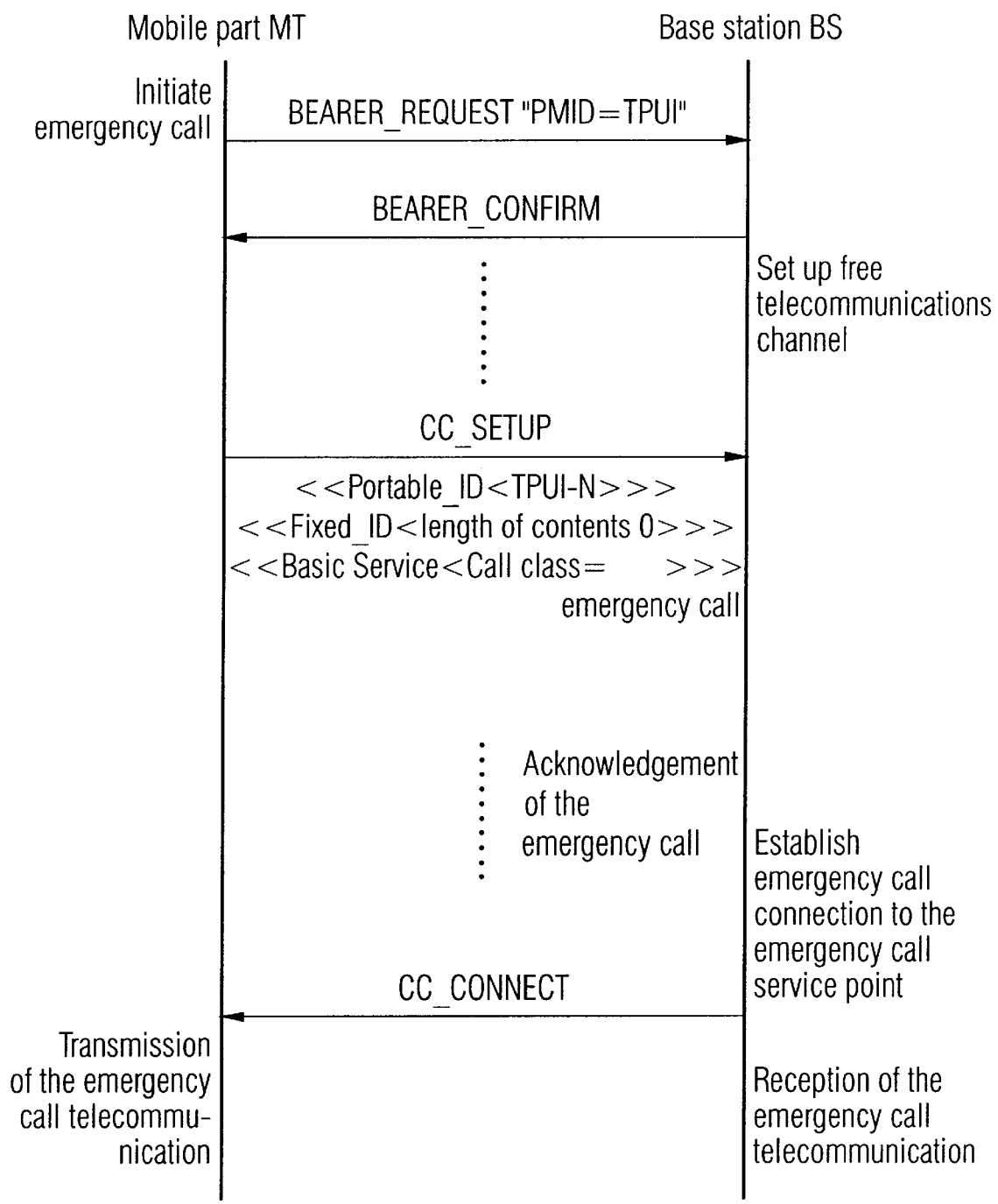

PROCESS FOR CONTROLLING THE INITIATION OF EMERGENCY CALLS IN CORDLESS TELECOMMUNICATION SYSTEMS, IN PARTICULAR DECT/GAP SYSTEMS

Method for controlling the making of emergency calls in cordless telecommunications systems, in particular DECT/GAP systems In telecommunications systems with a telecommunication transmission link between a telecommunication source and a telecommunication sink, transmission and reception units are used for processing and transmitting telecommunications, in which units 1) it is possible for the processing and transmission of telecommunications to take place in a preferred transmission direction (simplex mode) or in both transmission directions (duplex mode),
2) the processing of telecommunications is analog or digital,
3) the transmission of telecommunications via the long-distance transmission link takes place wirelessly on the basis of various telecommunications transmission methods FDMA (Frequency Division Multiple Access), TDMA (Time Division Multiple Access) and/or CDMA (Code Division Multiple Access)—for example according to radio standards such as DECT, GSM, WACS or PACS, IS-54, PHS, PDC etc. (see IEEE Communications magazine, January 1995, pages 50 to 57; D. D. Falconer et al: "Time Division Multiple Access Methods for Wireless Personal Communications") and/or in a wirebound fashion.

"Telecommunication" is a superordinate term which stands both for the signal contents (information) and for the physical representation (signal). Despite a telecommunication having the same content—that is to say the same information—different signal forms may occur. Thus, for example, a telecommunication relating to an object can be transmitted according to the following form:

(1) as an image,
(2) as a spoken word,
(3) as a written word,
(4) as an encrypted word or image.

The method of transmission according to forms (1), (2) and (3) is normally characterized here by continuous (analog) signals, whereas in the transmission method according to form (4) discontinuous signals (e.g. pulses, digital signals) are usually produced.

Taking this general definition of a telecommunications system as a basis, the invention relates to a method for controlling the making of emergency calls in cordless telecommunications systems, in particular DECT/GAP systems.

Cordless telecommunications systems of the type defined above are, for example, DECT systems (Digital Enhanced (earlier: European) Cordless Telecommunication; cf. (1): Nachrichtentechnik Elektronik (Telecommunications electronics) 42 (1992) Jan./Feb. No. 1, Berlin, DE; U. Pilger "Struktur des DECT-Standards"[Structure of the DECT Standard], pages 23 to 29 in conjunction with the ETSI publication ETS 300175- 1 . . . 9, October 1992; (2): Telecom Report 16 (1993), No. 1, J. H. Koch: "Digitaler Komfort für schnurlose Telekommunication —DECT-Standard eröffnet neue Nutzungsgebiete" (Digital convenience for cordless telecommunications—DECT standard opens up new fields of use), pages 26 and 27; (3): tec 2/93—Das technische Magazin von Ascom "Wege zur universellen mobilen Telekommunikation" (The technical magazine from Ascom "Ways toward universal mobile telecommunications), page 35 to 42; (4): Philips Telecommunication Review, Vol. 49, No. 3, September 1991, R. J. Mulder: "DECT, a universal cordless access system"; (5): WO 93/21719 (FIGS. 1 to 3 with associated description) or GAP systems (Generic Access Profile; ETSI publication prETS 300444, April 1995, Final Draft, ETSI, FR), which may be designed, for example, in accordance with the illustration in FIG. 1.

The GAP Standard is a subset of the DECT Standard and has the function of ensuring the interoperability of the DECT air interface, in particular for public telecommunications applications.

Where DECT/GAP systems are referred to below, private and/or public systems are thus meant.

According to the DECT/GAP standard, it is possible, in accordance with the illustration in FIG. 1, to set up at a DECT/GAP base station BS a maximum of 12 connections according to the TDMA/FDMA/TDD method (Time Division Multiple Access/Frequency Division Multiple Access/Time Division Duplex) in parallel to DECT/GAP mobile parts MT1 . . . MT12 over a DECT/GAP air interface configured for the frequency range between 1.88 and 1.90 GHz. The number 12 results from the number "k" of time slots or telecommunications channels (k=12) available for the duplex mode of a DECT/GAP system. The connections here may be internal and/or external. When there is an internal connection, two mobile parts registered at the base station BS, for example the mobile part MT2 and the mobile part MT3, can communicate with one another. To set up an external connection, the base station BS is connected to a telecommunications network TKN, for example in line-bound form via a telecommunications connection unit TAE and/or a private branch exchange system NStA with a line-bound telecommunications network or, in accordance with WO 95/05040 in wireless form as a repeater station with a superordinate telecommunications network. When there is an external connection, it is possible to use a mobile part, for example the mobile part MT1, to communicate with a subscriber in the telecommunications network TKN via the base station BS, the telecommunications connection unit TAE or the private branch exchange system NStA. If the base station BS has—as is the case of the Gigaset 951 (Siemens cordless telephone, cf. Telcom report 16, (1993) Issue 1, pages 26 and 27)—only one connection to the telecommunications connection unit TAE and/or to the private branch exchange system NStA, only one external connection can be set up. If the base station BS has—as in the case of the Gigaset 952 (Siemens cordless telephone; cf. Telcom report 16, (1993), issue 1, pages 26 and 27) —two connections to the telecommunications network TKN, a further external connection, in addition to the external connection to the mobile part MT1, is possible from a line-bound telecommunications terminal TKE which is connected to the base station BS. In this context, it is in principle also conceivable for a second mobile part, for example the mobile part MT12, to use the second port for an external connection, instead of the telecommunications terminal TKE. While the mobile parts MT1 . . . MT12 are operated with a battery or an accumulator, the base station BS which is designed as a cordless small-scale exchange is connected to a voltage network SPN via a mains connection unit NAG.

FIG. 2 shows, on the basis of the publication Components 31 (1993), Issue 6, pages 215 to 218; S. Althammer, D. Brückmann: "Hochoptimierte IC's für DECT-Schnurlostelefone" (Highly optimized ICs for DECT cordless telephones) the basic circuitry design of the base station BS and of the mobile part MT. According to the latter, the base station BS and the mobile part MT have a radio component FKT with an antenna ANT which is assigned to transmitting and received radio signals, a signal processing device SVE and a central controller ZST which are connected to one another in the illustrated way. The radio component FKT contains essentially the known devices such as a transmitter SE, a receiver EM and a synthesizer SYN. The signal processing device SVE contains, inter alia, a coding/decoding device CODEC. The central controller ZST has a microprocessor µP, both for the base station BS and for the mobile part MT, with a program module PGM, set up according to the OSI/ISO layer model (cf. (1): Instruction sheets—Deutsche Telekom, year 48, 2/1995, pages 102 to 111; (2): ETSI publication ETS 300175-1 . . . 9, October 1992), a signal control component SST and a digital signal processor DSP, which are connected to one another in the way illustrated. Of the layers defined in the layer model, only the directly essential first four layers are illustrated for the base station BS and the mobile part MT. The signal control component SST is designed as a Time Switch Controller TSC in the base station BS and as a Burst Mode Controller BMC in the mobile part MT. The essential difference between the two signal control components TSC, BMC consists in the fact that the base station-specific signal control component TSC additionally assumes switching functions in comparison with the mobile part-specific signal control component BMC.

The principal method of operation of the circuit units specified above is described for example in the publication Components 31 (1993), Issue 6, pages 215 to 218, cited above.

The described circuitry design according to FIG. 2 is supplemented in the base station BS and the mobile part MT in accordance with their function in the DECT/GAP system according to FIG. 1 by means of additional function units.

The base station BS is connected to the telecommunications network TKN via the signal processing device SVE and the telecommunications connection unit TAE or the private branch exchange system NStA. As an option, the base station BS can also have a user interface (functional units shown with broken lines in FIG. 2), which comprises, for example, an input device EE designed as a keypad, a display device AE designed as a display, a hand-held unit SHE designed as a handset with microphone MIF and earphone HK, as well as a ringer TRK.

The mobile part MT has a user interface which is possible with the base station BS as an option and which has the control elements described above, which are associated with this user interface.

FIG. 3 shows, taking the DECT system according to FIG. 1 as a starting point, a cellular DECT/GAP multisystem CMI (Cordless Multicell Integration), in which a plurality of the DECT/GAP systems TKD described above, each with one base station BS and one or more mobile parts MT are present at a given geographical location, for example concentrated—in a "hot spot" arrangement —in an administration building with large open-plan offices. However, instead of an "enclosed"geographical location, such as the administration building, an "open" geographical location with strategic telecommunication significance, for example squares in large cities with a high traffic volume, a large collection of commercial units and large volumes of people moving, it also possible for the installation of a cellular DECT/GAP multisystem CMI. A number of the base stations BS arranged in the open-plan office are designed here, in contrast to the base stations according to WO 95/10764 shown in FIGS. 1 and 2, as antenna diversity base stations. The concentration of the DECT/GAP systems TKS is so marked here (uninterrupted radio coverage of the geographical location), that individual DECT/GAP systems TKS operate in the same area as a result of the overlapping cellular DECT/GAP radio cells FB.

Depending on the degree of overlapping, the same area may mean here that a) a first base station BS1 of a first telecommunications system TKS1 is arranged in a first radio cell FB1 and a second base station BS2 of a second telecommunications system TKS2 is arranged in a second radio cell FB2 and can set up telecommunications connections to at least one mobile part $MT_{1,2}$ b) a third base station BS3 of a third telecommunications system TKS3 and a fourth base station BS4 of a fourth telecommunications system TKS4 are arranged in a common third radio cell FB3 and can set up telecommunications connections to at least one mobile part $MT_{3,4}$.

FIG. 4 shows, taking FIGS 1 to 3 as a basis and with reference to the publication "Nachrichtentechnik Elektronik (Telecommunications Electronics) 42 (1992) Jan./Feb., No. 1. Berlin, DE; U. Pilger: "Struktur des DECT-Standards" (Structure of the DECT Standard), pages 23 to 29 in conjunction with ETS 300175-1 . . . .9, October 1992" the TDMA structure of the DECT/GAP system TKS. The DECT/GAP system is a hybrid system in terms of the multiple access methods in which, in accordance with the FDMA principle, it is possible to transmit radio telecommunications on ten frequencies in the frequency band between 1.88 and 1.90 GHz from the base station BS to the mobile part MT and from the mobile part MT to the base station BS (Time Division Duplex Mode) according to the TDMA principle in accordance with FIG. 4 in a prescribed time sequence. The time sequence is determined here by a multiple time frame MZR, which occurs every 160 ms and which has 16 time frames ZR, each with a time period of 10 ms. Information which relates to a C-, M-, N, P-, Q-channel defined in the DECT Standard is transmitted separately to the base station BS and mobile part MT in these time frames ZR. If information for a plurality of these channels is transmitted in one time frame ZR, the transmission takes place according to a priority list where M>C>N and P>N. Each of the 16 time frames ZR of the multiple time frame MZR is divided in turn into 24 time slots ZS, each with a time period of 417 µs, of which 12 time slots ZS (time slots 0 . . . 11) are intended for the transmission direction "base station BS→mobile part MT" and a further 12 time slots ZS (time slots 12 . . . 23) are intended for the transmission direction "mobile part MT→base station BS". In each of these time slots ZS, information with a bit length of 480 bits is transmitted in accordance with the DECT Standard. Of these 480 bits, 32 bits are transmitted as synchronization information in a SYNC field and 388 bits are transmitted as useful information in a D field. The remaining 60 bits are transmitted as additional information in a Z field and as protective information in a "guard time" field. The 388 bits of the D field which are transmitted as useful information are in turn divided into a 64 bit-long A field, a 320 bit-long B field and a 4 bit-long "X-CRC" word. The 64 bit-long A field is composed of an 8 bit-long data header, a 40 bit-long data record with data for the C-, Q-, M-, N-, P- channels and a 16 bit-long "A-CRC" word.

Moreover, in addition to the abovementioned DECT/GAP systems, further future cordless telecommunications systems, which are based on the known multiple access methods FTMA, TDMA, CDMA (Frequency Division Multiple Access, Time Division Multiple Access, Code Division Multiple access), and hybrid multiple access methods formed therefrom, are possible for transmitting emergency calls.

For setting up telecommunications connections between the base station or stations BS and the mobile parts MT in the DECT/GAP systems in accordance with FIGS. 1 to 4, the procedure described below is provided, by way of example, in the DECT/GAP standard.

The base station BS (Radio Fixed Part RFP) in accordance with FIGS. 1 to 4 transmits the so-called dummy bearer on simplex transmission paths over the DECT air interface at regular time intervals, said dummy bearer being broadcast information which is received by the mobile part MT (Radio Portable Part RPP) in accordance with FIGS. 1 to 4 and being used by the latter for the synchronization and the connection set-up with the base station. The broadcast information does not necessarily have to be transmitted on a dummy transmission path (dummy bearer).

It is also possible for there to be no dummy transmission path because the base station already maintains at least one telecommunications connection, a so-called traffic transmission path (traffic bearer), to another mobile part, on which transmission path it then transmits the necessary broadcast information. In this case, the mobile part which wishes to have a telecommunications connection to the base station can receive the broadcast information —as in the case of the transmission of the broadcast information on the dummy transmission path.

The broadcast information contains—in accordance with the ETSI publication ETS 300175-3, October 1992, Chapter 9.1.1.1—information on access rights, system information and paging information.

Furthermore, the system information contains additional information which informs the mobile part whether the base station is a base station via which emergency calls can be transmitted (a subject which was publicly discussed in the ETSI-RES03R. Gremium and ETSI-RES03N Gremium in the 1st half of 1996).

If the mobile part has received this additional information and if the respective mobile part also has access rights to the base station transmitting the additional information (for example if the mobile part is signed on and registered with the base station in accordance with WO 94/10785—Patent claims iVm of the description of FIG. 4), a preconfigured emergency call number is automatically dialled and an emergency call connection established to emergency call service points in accordance with a special user interface procedure (for example dialling of the emergency call number, 112, pressing of an emergency call key, selection of an item of menu information "EMERGENCY CALL" etc.) on the mobile part in accordance with the GAP Standard (cf. ETSI publication prETS 300444, April 1995) based on a set-up procedure for normal (usual) outgoing telecommunications connections via a direct call connection (cf. ETSI publication prETS 300444, April 1995, Chap. 8.10 ("CC_ INFO<<MULTI KEYPAD>>).

The procedure described above, for transmitting emergency calls in a DECT/GAP system may be sufficient for private systems in which it can be assumed that the mobile parts have an access authorization to base stations, but the defined procedure is inadequate for public systems in which the access authorization is perhaps only given in individual cases.

Furthermore, in the procedure described above for transmitting emergency calls in a DECT/GAP system it is not always ensured that the mobile parts with an access authorization can transmit emergency calls to a base station in all cases. Thus, for example, the case may occur in which the respective base station has no free channels any more, for example because of limited channel resources, or must decline a request or a wish for the transmission of an emergency call for other (unusual) reasons (cf. ETSI publication prETS 300444, April 1995, Chap. 8.2.2.3 and Chap. 8.8). The respective mobile part can then search for other base stations via which emergency calls can still be transmitted, but there is no guarantee that this search will be successful.

Furthermore, there remains the problem of how, if in the first place an emergency call has been successfully transmitted from a mobile part via a base station to an emergency service, that is to say an emergency call connection exists, when and, in particular, who can terminate or clear this existing call connection again.

The transmission of emergency calls in wireless telecommunications systems is known in mobile radio systems in accordance with the GSM Standard (cf. publication by M. Mouly, M-B. Pautet: "The GSM System for Mobile Communications" 1992, Int. Standard Book No. 2-9507190-0-7, pages 49, 453, 437 and 532–535).

The problems discussed above in conjunction with the transmission of emergency calls are not found in these mobile radio systems.

SUMMARY OF THE INVENTION

The object on which the invention is based consists in controlling the making of emergency calls in cordless telecommunications systems, in particular DECT/GAP systems, efficiently and reliably.

In general terms the present invention is a method for controlling the making of emergency calls in cordless telecommunications systems, in particular DECT systems. Cordless base stations transmit additional information which is received by cordless mobile parts and indicates to them that the emergency calls can be made by means of system-specific emergency call transmission procedures to emergency call service points via the cordless base stations. First cordless mobile parts which receive the additional information from first cordless base stations to which the first cordless mobile parts do not have access authorization, are, as a precaution for the making of emergency calls by means of system-specific first emergency call transmission procedures, synchronized at least temporarily to the first cordless base stations for a telecommunication which is restricted to the making of emergency calls.

Advantageous developments of the present invention are as follows.

The first emergency call transmission procedure contains the following procedural steps:

a) the emergency call is initiated by a manual control interface procedure at the cordless mobile part, b) the cordless mobile part transmits a first telecommunication with an emergency call-specific temporary first identification to the cordless base station, with which telecommunication the mobile part searches at the cordless base station for an emergency call connection to the emergency call service point, c) the cordless base station distinguishes between a usual communications request and an emergency call by means of the first identification received.

d) the cordless base station responds to the first telecommunication with a second telecommunication, and ensures that a free telecommunications channel is set up for the emergency call connection, e) the cordless mobile part transmits to the cordless base station a third telecommunication with a first information element containing a call indicator for the emergency call, with a second information element containing a mobile part-specific, second identification, and with a third information element containing a zero contents indicator, which third telecommunication causes the cordless base station to set up the emergency call connection to the emergency call service point, and f) the cordless base station sets up the emergency call connection to the emergency call service point and informs the cordless mobile part of the setting up of the emergency call connection, in response to the third telecommunication by means of a fourth telecommunication.

The emergency call connection to the emergency call service point is set up by means of the automatic dialling of an emergency call number if the first cordless base station is a private cordless base station.

The emergency call connection to the emergency call service point is set up automatically if the first cordless base station is a public cordless base station.

The free telecommunications channel is set up for the emergency call connection by reserving one telecommunications channel from the number of telecommunications channels available in the cordless base station.

The free telecommunications channel is set up for the emergency call connection in that, from the number of telecommunications channels available in the cordless base station, when the latter are all occupied, one telecommunications channel of the telecommunications channels is freed.

The telecommunications channel has a radio channel between the cordless base station and the cordless mobile par and a voice/data channel between the cordless base station and the emergency call service point.

An established emergency call connection within the cordless communications system is cleared down by the cordless base station.

The cordless telecommunications system is a DECT/GAP system.

The cordless telecommunications system is a PHS system, a WACS system or a PACS system.

The cordless telecommunications system is a CDMA system, a TEMA system, an FDMA system or a system which is hybrid in terms of the above-described transmission standards.

The idea on which the invention is based consists essentially in controlling the making of emergency calls be means of a special procedure in such a way that allowance is made for the fact that the system contains mobile parts which do or do not have access authorization to base stations in cordless telecommunications systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 5 shows, with reference to an initiation-state diagram, an emergency call transmission procedure which ensures efficient and reliable transmission of emergency calls in DECT/GAP systems according to FIGS. 1 to 4.

DESCRIPTION OF THE PREFERRED EMBODIMENTS

Figure 1:
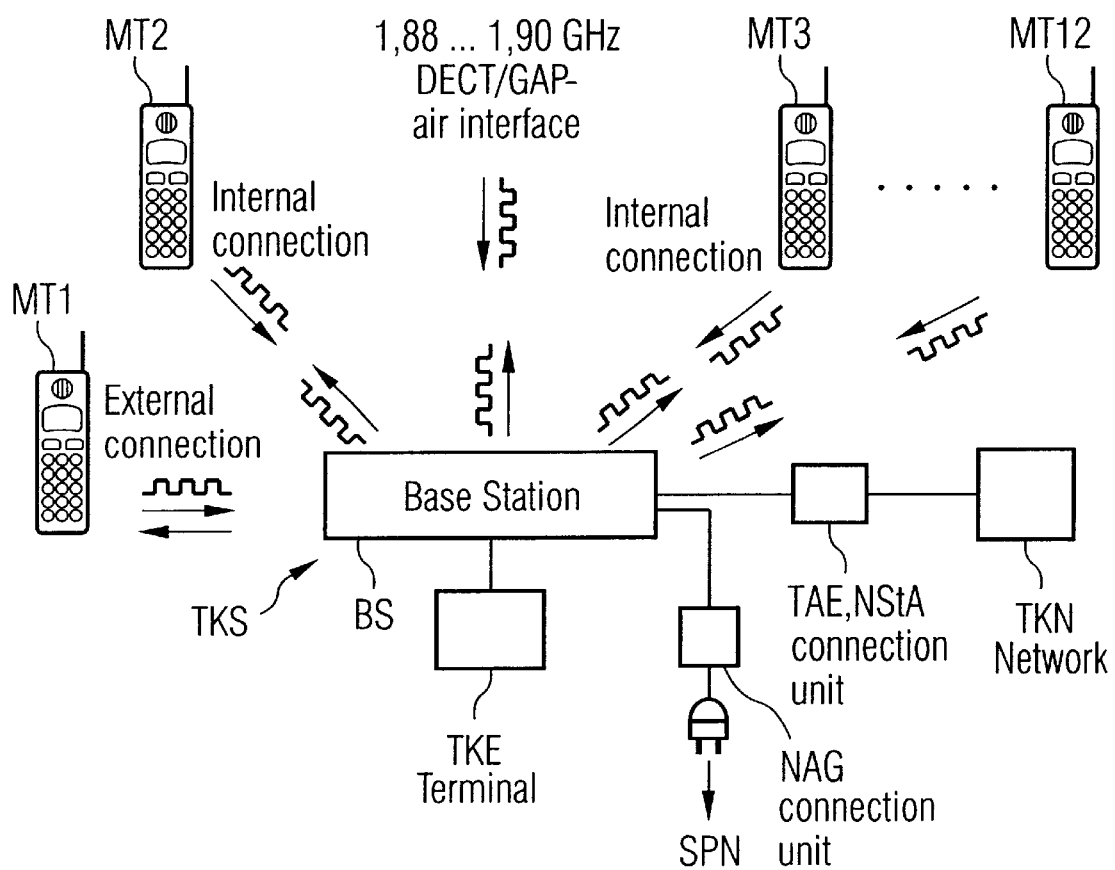
FIG. 1 depicts a cordless telecommunication system, particularly a DECT system.
Figure 2:
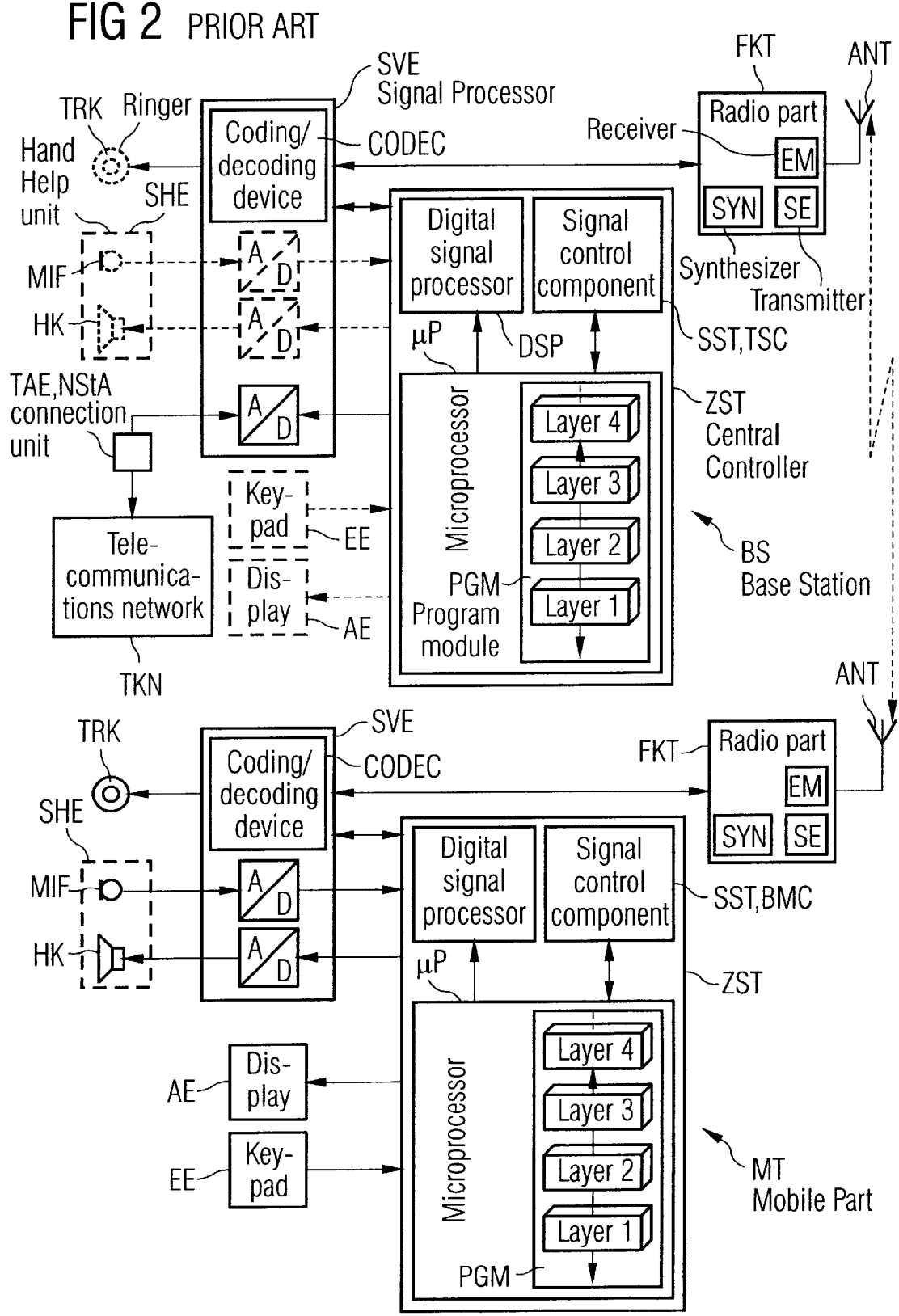
FIG. 2 depicts the design of a base station and a mobile part in the FIG. 1 system.
Figure 3:
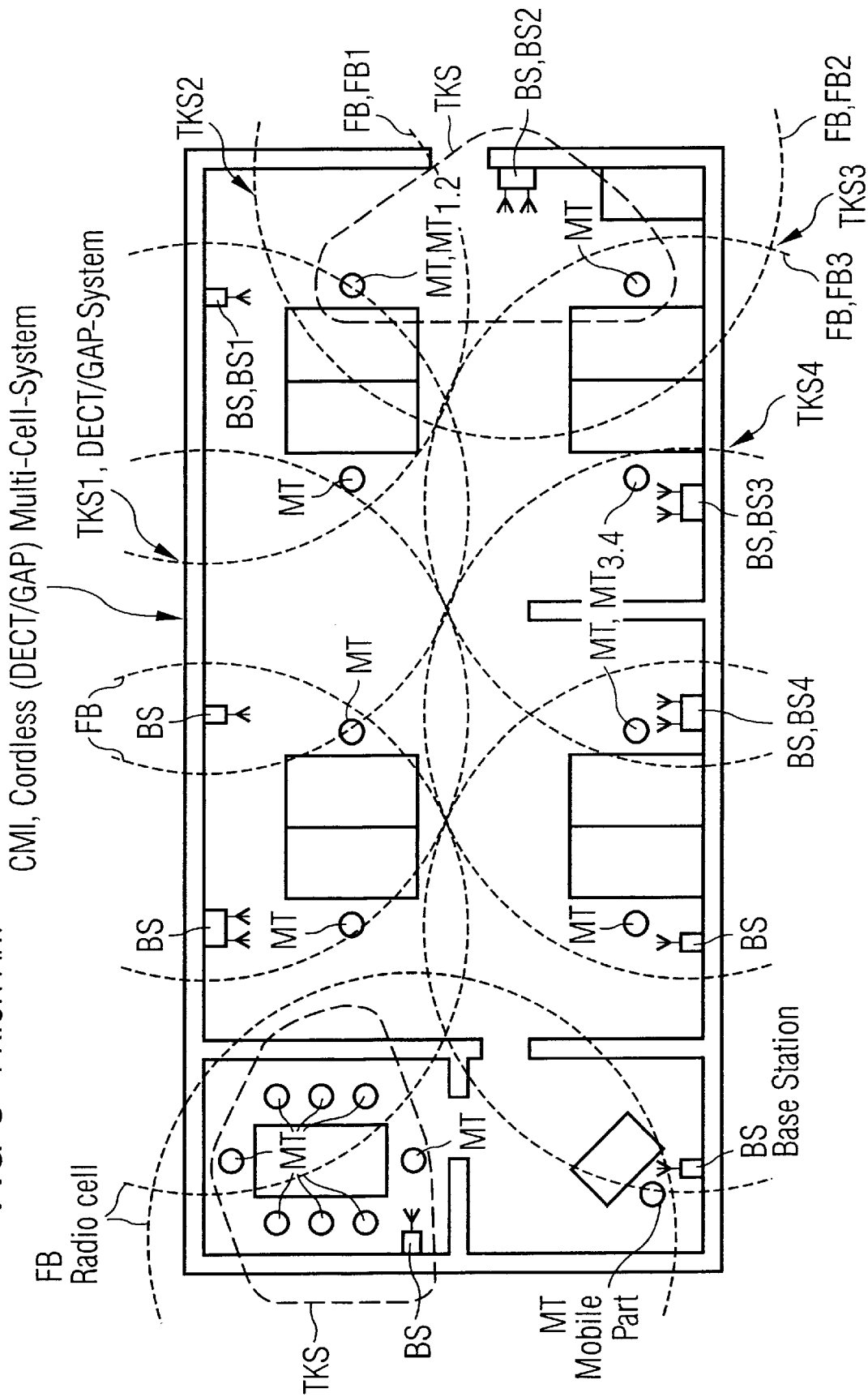
FIG. 3 depicts a cellular DECT/GAP multisystem.
Figure 4:
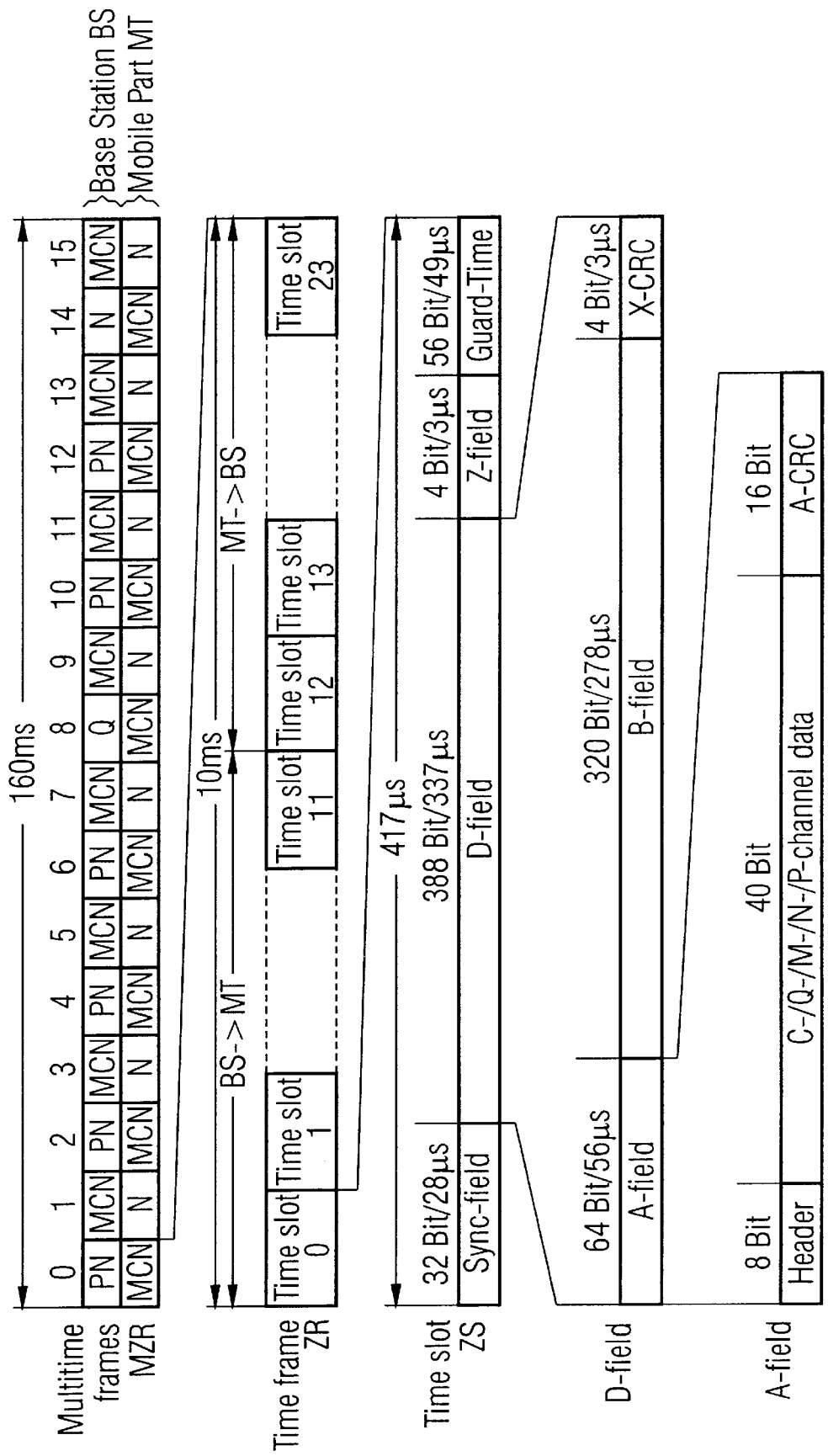
FIG. 4 depicts the TDMA structure of the DECT/GAP system.

Before the mobile part MT (portable part) starts the illustrated procedure with the base station BS (fixed part), it should either have—as already mentioned at the beginning—an access authorization to this base station BS, or, if this is absent, it should, as a precaution, have synchronized, at least temporarily, with the base station BS for telecommunication which is limited to the transmission of emergency calls. This advance synchronization substantially shortens the clear-down time of an emergency call in an emergency. The synchronization with a base station is achieved in that the latter broadcasts the additional information mentioned at the beginning, within the scope of the transmitted broadcast information. During the search for a base station to which the mobile part does not have any access authorization, it is advantageous if the mobile part firstly searches for public base stations, because they will broadcast the additional information with greater probability in comparison with private base stations, and then searches for private base stations only when such a search has been without success. As a criterion for distinguishing between a public base station and a private base station there is only the identification ARC (ACCESS RIGHTS CLASS), which is used by the public base stations and which is transmitted significantly more frequently than the additional information.

If the mobile part MT has found a base station BS according to the above criteria, when needed when the transmission of an emergency call is initiated at the mobile part MT by means of, as already mentioned, a manual user interface procedure.

Then, within the scope of a connection set-up procedure (Bearer set-up procedure; cf. ETSI-publication ETS 300175-3, October 1992, Chap. 10.5.1.1.), the mobile part MT transmits to the base station BS a first MAC telecommunication "BEARER_REQUEST" (cf. ETSI publication ETS 300175-3), October 1992, Chap. 7.3.3.2) with the parameter "PMID" (Portable MAC Identifier), to which the parameter "TPUI" (Temporary Portable User Identification; cf. ETSI publication ETS 300175-6, October 1992, chap 6.3.1) is assigned as an emergency call-specific temporary identification. With this telecommunication specified in this way, the base station BS can distinguish between an emergency call request and a normal call request of the mobile part. As a response to the received first telecommunication, the base station BS transmits a second MAC telecommunication "BEARER_CONFIRM" (cf. ETSI publication ETS 300175-3, October 1992, Chap. 7.3.3.3) to the mobile part MT.

If the base station BS (the MAC protocol layer) has recognized an emergency call request, higher protocol layers, and the protocol layer control (Lower Layer Management Entity LLME), are given the task of setting up a free telecommunications channel. The device can take such a form here that either—if all the telecommunications channels available in the base station are seized—a free channel is created by clearing an existing telecommunications connection or a free channel is reserved from the outset. If, in the present case, the channel is a telecommunications channel, both the net-work-side voice and data channels and the radio channels or time slots are thus meant.

After the free telecommunications channel has been set up, and the mobile part MT has been informed of this, the mobile part MT transmits a first NWK telecommunication "CC-SETUP" (cf. ETSI publication ETS 300175-5, October 1992, Chap. 6.3.2.1) with 1) the information element "BASIC SERVICE", (cf. ETSI publication ETS 300175-5), October 1992, Chap. 7.6.4) in which the segment "CALL CLASS" has the content "emergency call",
2) the information element "PORTABLE IDENTITY" (cf. ETSI publication ETS 300175-5, October 1992, Chap. 7.7.30) and the segment "IPUI-N",
3) the information element "FIXED IDENTITY" (cf. ETSI publication ETS 300175-5, October 1992, Chap. 7.7.18) and the segment "LENGTH OF CONTENTS 0".

The base station BS is intended to accept this NWK telecommunication from the mobile part MT without checking the "FIXED_IDENTITY" and the "PORTABLE_IDENTITY" and to proceed with the NWK protocol layer procedure in accordance with the GAP Standard (cf. ETSI publication prETS 300444, April 1995, Chap. 8.2) without checking NWK protocol layer identification.

After the emergency call has been acknowledged in accordance with the GAP Standard, the base station BS establishes the emergency call connection to the emergency call service points and transmits a second NWK telecommunication "CC-CONNECT" (cf. ETSI-publication ETS 300175-5, October 1992, Chap. 6.3.2.6) to the mobile part MT. The emergency call connection is preferably established here automatically in the case of a public base station and preferably by the automatic dialling of an emergency call number in the case of a private base station.

The actual emergency call telecommunication can now be input directly or indirectly at the mobile part MT. This emergency call telecommunication to the emergency call service passes via the base station BS.

In addition, it is advantageous that, if the emergency call connection exists and the emergency call telecommunication has been transmitted, the existing emergency call connection is cleared again by the base station. In this way it is possible that, in an emergency, for example an accident, the emergency call connection cannot be cleared by inadvertent user interface procedures at the mobile part.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling formation of emergency calls in cordless telecommunications systems, comprising the steps of:

transmitting via cordless base stations additional information which is received by cordless mobile parts and indicating to the mobile parts that emergency calls can be made by system-specific emergency call transmission procedures to emergency call service points via the cordless base stations;

synchronizing first cordless mobile parts, which receive the additional information from first cordless base stations to which the first cordless mobile parts do not have access authorization, as a precaution for formation of emergency calls by system-specific first emergency call transmission procedures, at least temporarily to the first cordless base station for a telecommunication which is restricted to formation of emergency calls.

2. The method according to claim 1, wherein the first emergency call transmission procedure contains the following procedural steps:

a) a respective emergency call is initiated by a manual control interface procedure at the cordless mobile part, b) the cordless mobile part transmits a first telecommunication message with an emergency call-specific temporary first identification to the cordless base station, with which telecommunication message said mobile part searches at the cordless base station for an emergency call connection to the emergency call service point, c) the cordless base station distinguishes between a usual communications request and an emergency call by the first identification received, d) the cordless base station responds to the first telecommunications message with a second telecommunication message, and ensures that a free telecommunications channel is set up for the emergency call connection, e) the cordless mobile part transmits to the cordless base station a third telecommunication message with a first information element containing a call indicator for the emergency call, with a second information element containing a mobile part-specific, second identification, and with a third information element containing a zero contents indicator, which third telecommunication message causes the cordless base station to set up the emergency call connection to the emergency call service point, f) the cordless base station sets up the emergency call connection to the emergency call service point and informs the cordless mobile part of the setting up of the emergency call connection, in response to the third telecommunication by a fourth telecommunication message.

3. The method according to claim 2, wherein the emergency call connection to the emergency call service point is set up by automatic dialing of an emergency call number if the first cordless base station is a private cordless base station.

4. The method according to claim 2, wherein the emergency call connection to the emergency call service point is set up automatically if the first cordless base station is a public cordless base station.

5. The method according to claim 2, wherein a free telecommunications channel is set up for the emergency call connection by reserving one telecommunications channel from a number of telecommunications channels available in the cordless base station.

6. The method according to claim 2, wherein a free telecommunications channel is set up for the emergency call connection in that, from the number of telecommunications channels available in the cordless base station when the latter number of telecommunications channels in the cordless base station are all occupied, one telecommunications channel of the telecommunications channels is freed.

7. The method according to claim 2, wherein the telecommunications channel comprises a radio channel between the cordless base station and the cordless mobile part and a voice/data channel between the cordless base station and the emergency call service point.

8. The method according to claim 2, wherein an established emergency call connection within the cordless communications system is cleared down by the cordless base station.

9. The method according to claim 1, wherein the cordless telecommunications system is a DECT/GAP system.

10. The method according to claim 1, wherein the cordless telecommunications system is one of a PHS system, a WACS system or a PACS system.

11. The method according to claim 1, wherein the cordless telecommunications system is one of a CDMA system, a TDMA system, an FDMA system or a system which is hybrid in terms of transmission standards.

* * * * *